United States Patent [19]
Giuhat et al.

[11] Patent Number: 5,881,145
[45] Date of Patent: Mar. 9, 1999

[54] REDIRECTION OF CALLS TO PORTED DIRECTORY NUMBERS IN TELEPHONE NETWORKS

[75] Inventors: Adrian Giuhat, Nepean; Edgar Martinez, Ottawa, both of Canada

[73] Assignee: Northern Telecom Limited, Montreal, Canada

[21] Appl. No.: 690,650

[22] Filed: Jul. 29, 1996

[51] Int. Cl.[6] .................................................. H04M 7/00
[52] U.S. Cl. ........................ 379/207; 379/220; 379/211
[58] Field of Search .................................. 379/210, 211, 379/212, 201, 207, 220, 221, 229

[56] References Cited

U.S. PATENT DOCUMENTS 5,438,568  8/1995  Weisser, Jr. ............................. 370/389
5,566,235  10/1996  Hetz ....................................... 379/207
5,664,102  9/1997  Faynberg ................................ 379/207

FOREIGN PATENT DOCUMENTS 2153281  1/1996  Canada .

OTHER PUBLICATIONS

Licther, "Generic Switching and Signaling Requirements for Number Portability", Illinois Number Portability Workshop, Issue 1.024, Jun. 17, 1996, pp. 1–76.

Primary Examiner—Ahmad F. Matar
Attorney, Agent, or Firm—Foley & Lardner

[57] ABSTRACT

In a telephone network having a plurality of network nodes, each having a unique network address and using out-of-band signalling for call setup and routing, a method is provided for the routing of calls to a "ported" directory number which has been ported from a donor network node to a recipient network node. The method comprises the steps of (i) routing the call, using the ported directory number as the Called Party Number, from an originating network node towards the donor network node; (ii) intercepting the call at an intermediate network node between the originating network node and the donor network node, through which intermediate network node calls to the donor network node must pass; (iii) converting the ported directory number to a network address of the recipient network node; (iv) routing the call to the recipient network node using said network address; and (v) at the recipient network node, completing the call to the ported directory number.

8 Claims, 3 Drawing Sheets

REDIRECTION OF CALLS TO PORTED DIRECTORY NUMBERS IN TELEPHONE NETWORKS

BACKGROUND OF THE INVENTION

1. Technical Field

The invention relates to telephone systems and, in particular, to so-called "number portability" whereby a subscriber may retain the same directory number when moving from one location and/or service provider to another or changing from one type of service to another, such as from wireless to landline or from business to residential.

2. Background Art

The invention is applicable to telephone systems which are known as "Intelligent Networks" (IN) or "Advanced Intelligent Networks" (AIN) and which employ out-of-band signalling systems such as Signalling System No. 7 (SS7), also known as Common Channel Signalling No. 7 (CCS7). Such signalling systems exchange Transaction Capabilities Application Part (TCAP) messages or queries between network elements to deploy selected services and ISDN-User Part (ISUP) messages between network node switching elements to set up and route calls. The TCAP and ISUP messages are handled by a data communications system separate from the trunks which carry the calls themselves. The elements of such intelligent telephone systems include Service Switching Points (SSPs) interconnected by trunks for carrying calls, and Signal Transfer Points (STPs) and Service Control Points (SCPs) connected to each other and the SSPs by SS7 data links for carrying signalling. A Service Control Point is an "intelligence center" with access to application databases enabling it to deliver various combinations of features, such as 1-800 number service and call redirection. A Signal Transfer Point (STP) is a signalling hub or concentrator, typically connecting several Service Switching Points to an SCP. A Service Switching Point (SSP) is a network node normally associated with a central office switch equipped with Signalling System Number 7 (SS7) messaging links to permit communication with the SCPs and which has special AIN call processing software including a plurality of "Point-in-Call triggers" which can be provisioned or set to interrupt call processing momentarily and initiate a TCAP query to the SCP for instructions on how to complete the call processing. Based upon the instructions, the originating end office seizes a trunk to a neighbouring switch and creates an Initial Address Message which it sends to the neighbouring switch via the signalling network. The Initial Address Message includes various parameters which will control routing of the call to its destination.

In circuit-switched telephone systems, each subscriber has a unique public directory number which is associated with a particular circuit of a switch at the subscriber's local office. As a general rule, if the subscriber transfers to a new service provider, the subscriber is assigned a new public directory number. For various reasons, it is desirable for a subscriber to be able to change service provider while keeping the same public directory number and any specific service features associated with it.

Various "local number portability" schemes have been proposed for "porting" a subscriber's directory number to a different switch and routing calls to it automatically, so that other subscribers may dial the same public directory number and still reach the subscriber, without knowing that the ported number is at a different switch. Procedures for achieving such "local number portability" were promulgated in a document entitled "Generic Switching and Signalling Requirements for Number Portability", Illinois Commerce Commission Workshop on LNP, Illinois, April 1996.

The former document proposes that, when a directory number is ported to a different switch, an entry will be made in the SCP database liking the ported directory number with the Location Routing Number of the recipient switch, i.e. the switch to which the subscriber transferred. Each originating end office will be notified that a number (NPA-NXX) from the "donor" office had been ported and will arm a trigger to query the SCP for instructions when trying to route any subsequent calls to that NPA-NXX. It is preferred to arm a trigger which will be actuated by any directory numbers beginning with that NPA-NXX rather than arm a trigger for each individual ported directory number. The SCP will return the Location Routing Number of the recipient switch. The originating switch will incorporate the Location Routing Number and the original dialled digits into a special Initial Address Message and route the call to the recipient switch, which will complete the call to the "ported" subscriber. The Initial Address Message is termed "special" because it will have the Location Routing Number in place of the usual "Called party number" and the original dialled digits (called number) as a parameter called the "Generic Address Parameter". This Generic Address Parameter is defined in Bellcore GR-697-CORE. At the recipient end office switch, the presence of the Location Routing Number (which cannot be dialled by a subscriber) in place of the called number will prompt the switch to look to the Generic Address Parameter for the called number to which the call should be completed.

Such an arrangement entails modifications to the SCP software, which is not particularly expensive because the SCPs are relatively few in number. A major disadvantage of this procedure, however, is that it requires every SSP in the network to be modified to give it the capability of creating the special Initial Address Messages and understanding those it receives. This entails considerable expense since there might be several hundred SSPs in the network.

Copending patent application Ser. No. 08/690,474 filed concurrently herewith, discloses and claims an improved method and apparatus for effecting number portability in a telephone network, particularly a so-called intelligent network, without requiring modification of the call processing software at originating network nodes or central office switches. In accordance with the invention of such copending application Ser. No. 08/690,474, there is provided a method of effecting directory number portability in a telephone network having a plurality of network nodes each having a unique network address and using out-of-band signalling for call setup and routing, such signalling system employing Initial Address Messages for controlling routing of the calls, such Initial Address Messages including selected ones of a Called Party Number, an Original Called Party Number, a Generic Address Parameter Number and a Forwarded Call Indicator, a method enabling routing of a call to a directory number that has been transferred from a donor switching unit at a donor network node in said telephone network to a recipient switching unit at a recipient network node in a different network controlled by a different service provider, the method including the steps of:

(i) in the telephone network, associating with a call to the ported directory number an Initial Address Message comprising the network address of the recipient network node as the Called Number and the ported directory number as the Original Called Number;

(ii) at a boundary between said telephone network and said different network, converting the Initial Address Message by making the Original Called Party number a Generic Address Parameter and setting a Forwarded Call Indicator flag to indicate that the Called Number as originally-dialled has been translated; and (iii) routing the call into said different network using the converted Initial Address Message.

Such copending patent application also deals with the situation where a ported directory number is ported to a recipient SSP within the telephone network, having been ported from a donor network node in the neighbouring or "different" network. In that case, calls to the ported number which originate in the other "different" network will have their Initial Address Messages converted at the boundary, but in reverse, i.e. the Forward Call Indicator flag will be dropped and the Generic Address Parameter digits will be transferred to the Original Called Party parameter. However, the copending application does not address the situation where a directory number is ported into the telephone company's network from the competing service provider's network and a caller within the telephone company's network tries to place a call to the ported directory number. In such a case, it is desirable for the telephone company to avoid routing the call into the service provider's network and having the service provider query its local number portability database and route the call back into the telephone company's network for completion. Not only could the service provider charge for accessing its database and returning the call back to the telephone company's network, but such a procedure would also cause what is known as "tromboning" by tying up two trunk circuits between the respective access nodes of the two networks.

SUMMARY OF THE INVENTION

The present invention seeks to provide an improved method and apparatus for effecting directory number portability in a telephone network, particularly a so-called intelligent network, without necessarily modifying software of originating switches and, where the directory number was ported from a different carrier, without necessarily accessing facilities of that carrier.

According to one aspect of the present invention, there is provided, in a telephone network or the like having a plurality of network nodes each having a unique network address and using out-of-band signalling for call setup and routing, a method of providing for the routing of calls to a directory number following porting of the directory number from a donor network node to a recipient network node, comprising the steps of:

(i) routing the call, using the ported directory number as the called party number, from an originating network node towards the donor network node;

(ii) intercepting the call at an intermediate network node between the originating network node and the donor network node through which intermediate network node calls to the donor network node must pass,;

(iii) converting the ported directory number/called party number to a network address of the recipient network node;

(iv) routing the call to the recipient network node using said network address; and (v) at the recipient network node, completing the call to the ported directory number.

According to a second aspect of the invention, there is provided a telephone network or the like having a plurality of network nodes each having a unique network address and means for employing out-of-band signalling for call setup and routing, one of said network nodes comprising a donor node from which a directory number has been ported and a recipient node to which the directory number has been ported, comprising:

(i) means for routing a call, using the ported directory number as the called party number, from an originating network node towards the donor network node;

(ii) means for intercepting the call at an intermediate network node, between the originating network node and the donor network node, through which intermediate network node calls to the donor network node must pass,;

(iii) means for converting the ported directory number/called party number to a network address of the recipient network node;

(iv) means for routing the call to the recipient network node using said network address; and (v) means at the recipient network node for completing the call to the ported directory number.

Various other objects, features and advantages of the present invention will become apparent from the following description, taken in conjunction with the attached drawings, of a preferred embodiment of the invention which is described by way of example only.

DESCRIPTION OF THE PREFERRED EMBODIMENTS

Figure 1:
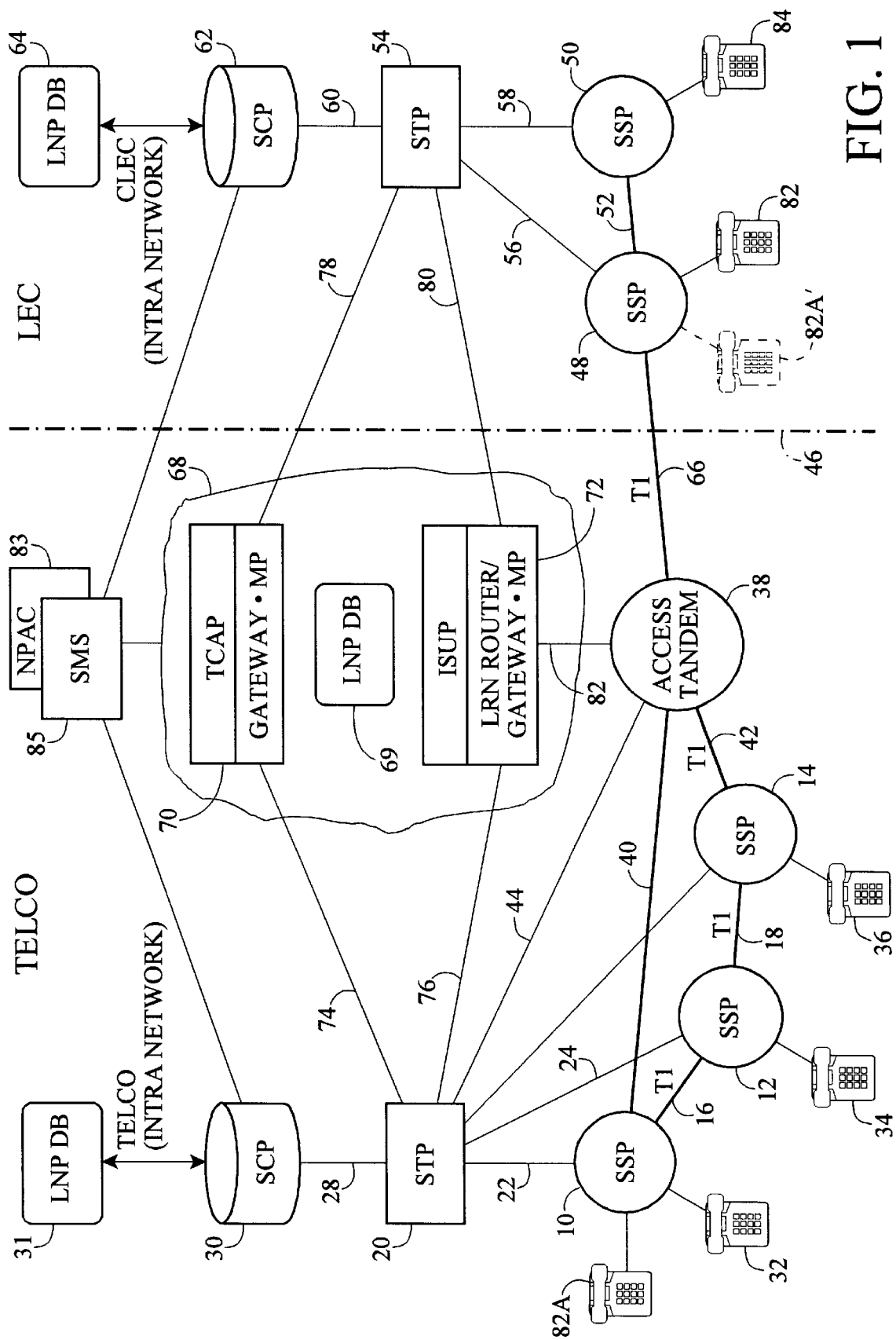
FIG. 1 illustrates, greatly simplified, a portion of a telephone company's Advanced Intelligent Network with an access SSP at a boundary with a network controlled by a different service provider.

Referring now to FIG. 1, an advanced intelligent network operated by a telephone company TELCO comprises three SSPs 10, 12 and 14 interconnected by T1 trunks 16 and 18, respectively, for voice calls and connected to a Signal Transfer Point 20 by SS7 signalling links 22, 24 and 26, respectively. The Signal Transfer Point 20 is connected by way of an SS7 link 28 to a Signal Control Point 30 which has access to a database 69 for entries relating to directory numbers ported from or to the TELCO network, as will be described in more detail later. The database 69 may be at or remote from the SCP 30.

Each SSP comprises a switching unit with SS7 signalling or message links and AIN software enabling it to communicate with the SCP 30 by means of TCAP messages to ascertain how to process a particular call and with other SSPs by means ISDN User Part Initial Address Messages (ISUP-IAM) to set up trunk connections for the calls. Parameters of Initial Address Messages are set out in Table I below, which is extracted from "Generic Requirements for Call Control Using ISDNUP", GR-697-CORE, Issue 1, February 1994.

TABLE A-4

Initial Address Message

| Parameter | Reference Section | Type | Length (octets) |
|---|---|---|---|
| Message type | B.11 | F | 1 |
| Nature of connection indicators | B.12 | F | 1 |
| Forward call indicators | B.10 | F | 2 |
| Calling party's category | B.5 | F | 1 |
| User service information | B.2 | V | 4 |
| Called party number | B.3 | V | 4–11 |
| Calling party number | B.4 | O | 5–12 |
| Hop counter | B.21 | O | 3 |
| Charge number | B.23 | O | 3–9 |
| Originating line information | B.24 | O | 3 |
| Carrier identification | B.25 | O | 5 |
| Jurisdiction information | B.26 | O | 2–5 |
| Original called number | B.27 | O | 5–12 |
| Redirecting number | B.28 | O | 5–12 |
| Access transport | B.29 | O | 3-? |
| Generic address | B.30 | O | 6–13 |
| Generic name | B.69 | O | 3–18 |

Each of the SSPs 10, 12 and 14 comprises an originating switching unit with subscribers represented by telephone sets 32, 34 and 36, respectively. An Access Tandem switch 38 is connected to SSP switches 10 and 14 by T1 trunks 40 and 42, respectively, and to Signal Transfer Point 20 by an SS7 link 44. The Access Tandem SSP 38 provides access to the TELCO network for calls from a neighboring network of, for example, a Competitive Local Exchange Carrier (CLEC). For convenience of illustration, the CLEC network is shown segregated from the TELCO network by a boundary line 46.

The CLEC network comprises SSPs 48 and 50 interconnected by a T1 trunk 52 and connected to an STP 54 by SS7 links 56 and 58, respectively. The STP 54 is connected by a link 60 to the CLEC's own SCP 62, which has access to the CLEC's LNP database 64. CLEC SSP 48 is also connected to Access Tandem SSP 38 by a trunk 66 for calls passing between the two networks.

Access to the TELCO network is controlled or mediated by a Signalling Mediation Server 68. In Advanced Intelligent Networks, the Signalling Mediation Server, which is also known as a Signalling Mediation Point (SMP), comprises, in essence, a Signal Transfer Point provided with Mediated Access software. The SMP controls access to a telephone company's network by third parties via a tandem or terminating node or end office controlled by the SMP. Various forms of mediated access have been promulgated, such as:

Access to the SSP using AIN 0.0 mediation

Access to the SSP using AIN 0.1 mediation

Access to the signalling network using protocol conversion of call set up message (also known as ISDN User Part mediation) to and from the telephone company/ Local Service Provider network.

The Signalling Mediation Server 68 comprises a TCAP module 70 and an ISUP module 72 connected to the TELCO Signal Transfer Point 20 by way of SS7 links 74 and 76, respectively, and to the CLEC STP 54 by links 78 and 80, respectively. The ISUP module 72 is also connected to Access Tandem SSP 38 by link 82. The TCAP Mediation Point module 70 handles TCAP messages passing between the TELCO STP 20 and the CLEC STP 54. For details of a suitable TCAP Mediation Point module 70, also referred to as an AIN Gateway—MP, the reader is directed to Canadian laid-open patent application number 2,153,281 which is incorporated herein by reference. A corresponding United States patent application is copending under Ser. No. 08/272,207 filed Jul. 8, 1994.

The ISUP Mediation Point module 72 handles ISUP IAM messages between the two networks and controls access to the TELCO network from the CLEC network for calls via T1 trunk 66 and Access Tandem SSP 38. In the CLEC network, SSPs 48 and 50 have subscribers represented by telephone sets 82 and 84, respectively.

For details of how a local number portability scheme deals with calls to a subscriber whose directory number has been ported from one of the TELCO SSPs to one of the CLEC SSPs, the reader is directed to copending patent application Ser. No. 08/690,474 filed concurrently herewith, which is incorporated herein by reference. Preferred embodiments of the present invention are concerned with effecting local number portability when the subscriber's directory number has been ported from the CLEC network to the TELCO network, especially when the directory number was previously ported to the CLEC network and is now being returned to the TELCO network but to a different SSP. Such a local number portability scheme according to a preferred embodiment of the present invention will now be described with reference also to FIGS. 2 and 3 which depict call flow in parts of the networks of FIG. 1 as local number portability is implemented for a subscriber A, represented by a telephone set 82A at TELCO SSP 10, who has transferred from CLEC SSP 48, the previous connection being represented by a telephone set 82A' with its connection to the SSP 48 show severed.

In accordance with the Illinois proposal, when the subscriber A moves, the service provider (TELCO) receiving the ported directory number notifies a (proposed) Number Portability Administration Center (NPAC) 83 accessible by the TELCO's and LEC's Service Management System(s) (SMS) 85. For particulars of the proposed notification procedure, the reader is directed to Illinois Commerce Commission document "LNP NPAC Interface Requirements for Number Portability". The SMS 85 instructs the SMP unit 68 and the SCP 30 which make entries in their LNP databases 69 and 31, respectively, linking the ported directory number as a pointer to the Location Routing Number (e.g. 715 566 0000) of the TELCO's recipient SSP 10. In addition, the Access Tandem SSP 38 is instructed and arms a PODP trigger in its PODP table so that, when subsequently it receives a call with the ported directory number as the Called Party Number in its Initial Address Message, it will send a TCAP message to the TCAP module 70 of SMP unit 68, via the STP 20, for instructions as to how to complete the call processing. All calls prefixed 613 567 will be routed to the CLEC via the Access Tandem SSP 38 which will be set up to translate calls to ported directory numbers to the tenth digit and route them back to the appropriate node. The recipient SSP 10 has a trigger (PODP or TAT) armed so as to initiate a TCAP query when a call is received with the recipient SSP's own network address as the Called Party Number.

A sample call set-up sequence will now be described, the messages being depicted in FIG. 2 by arrows numbered according to the following sequence of steps:

1. Caller B, who is represented by a telephone set 34 at TELCO SSP 12, dials the ported directory number, 613 567 1111.

2. SSP 12 formulates a normal Initial Address Message with the ported directory number as "Called Party Number" and routes the call to SSP 14, sending the IAM via the STP 20. The routing is based upon the NPA NXX.

3. SSP 14 routes the call to the Access Tandem SSP 38 based upon the NPA-NXX.

4. At the Access Tandem SSP 38, the PODP trigger in the call processing software responds to the ported directory number as "called party number" and initiates a TCAP message to the TCAP module 70 of SMP 68 via the STP 20. The TCAP module 70 accesses its LNP database 69 and returns to the access tandem SSP 38 a message comprising the Location Routing Number for SSP 10.

5. The access tandem SSP 38 creates an Initial Address Message with the Location Routing Number as the "called party number" and the original dialled digits as the "Original Called Party Number" and then seizes trunk 40 and routes the call to recipient SSP 10.

6. A PODP or TAT (Termination Attempt Trigger) trigger in the recipient SSP 10 responds to the fact that the "Called Party Number" is, in fact, a Location Routing Number, which cannot be dialled, and initiates TCAP a query message to the SCP 30, via the STP 20, for instructions on how to complete the call. The query message will include the ten digit Location Routing Number (715 566 0000) of SSP 10 and the originally dialled digits (613 567 1111). SCP 30 will access its LNP database 31, detect that the directory number has been ported, and return to the SSP 10 the originally dialled digits as the called party number.

7. On receipt of these ten digits, the SSP 10 completes the call to the ported directory number and thus to subscriber A.

It should be appreciated that Access Tandem SSP 38 could be an end office, in which case, instead of a PODP trigger at Access Tandem SSP 38, a Termination Attempt Trigger (TAT) could be armed on the ported directory number so as to redirect calls to the ported number back into the TELCO network as described above.

It should be noted that the call to the ported directory number is processed entirely within the TELCO network and does not tie up any of the trunk circuits 66 (FIG. 1) between the access tandem SSP 38 and the CLEC SSP 48.

It should also be recognized that, although the above procedure avoids "tromboning" in the trunk 66 between the TELCO network and the CLEC network, under some conditions, "tromboning" may occur within the TELCO network. For example, if trunk 40 from the access tandem switch 38 to recipient SSP 10 does not have any circuits available, alternate routing might force the access tandem SSP 38 to route the call to recipient SSP 10 via SSP 14, i.e. using SSP 14 as a tandem node. This would tie up two circuits in trunk 42. This may be acceptable because it is under the control of the telephone company. Nevertheless, a second embodiment of the invention, which avoids such tromboning in trunk 42, will now be described with reference to FIG. 3.

Figure 2:
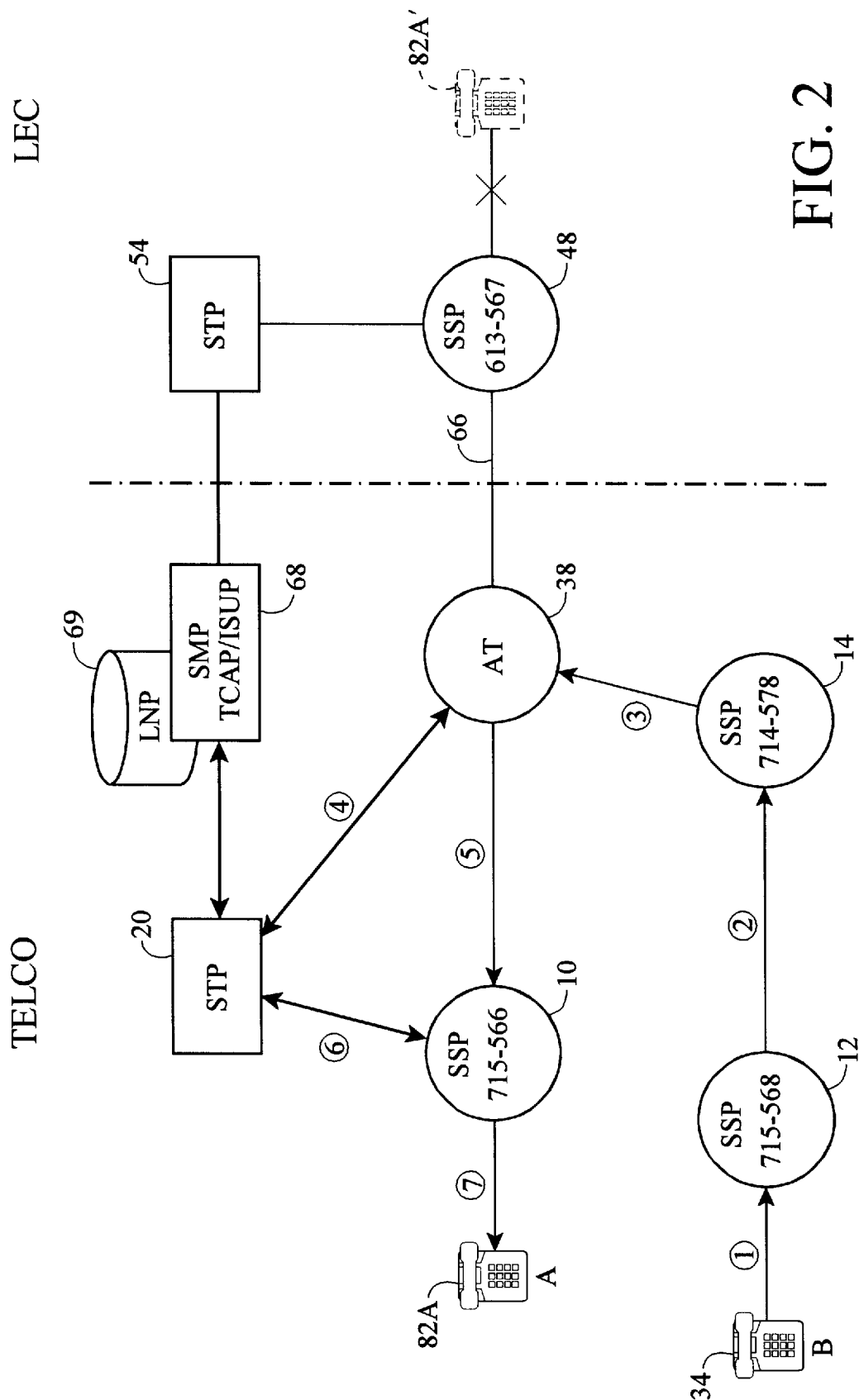
FIG. 2 illustrates local number portability with the access SSP using TCAP messaging in redirecting calls to a ported directory number which has been ported from the different service provider's network to the telephone company's network.
Figure 3:
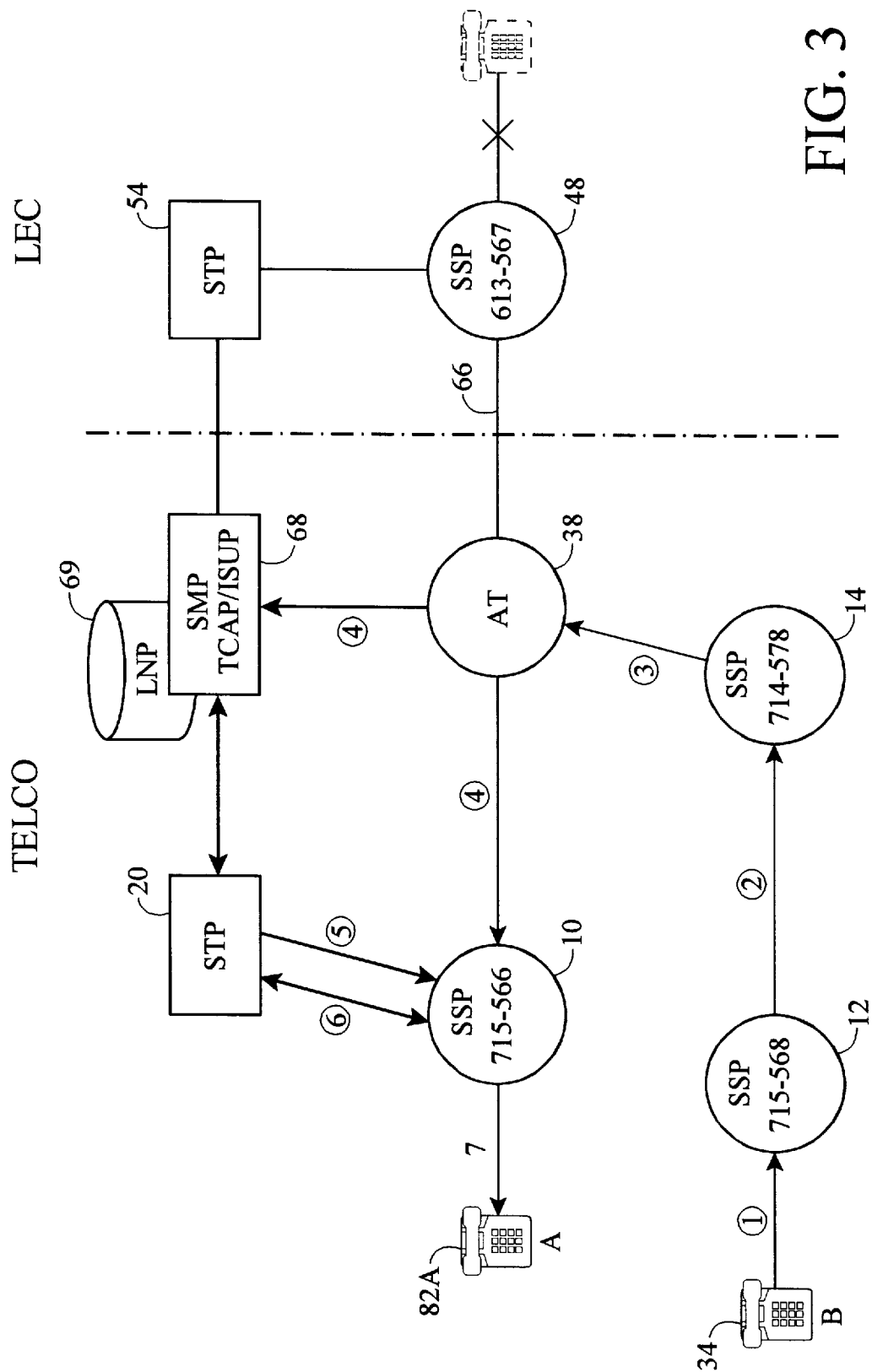
FIG. 3 corresponds to FIG. 2 but with the access SSP using ISUP messaging rather than TCAP messaging when redirecting the call.

In FIG. 3, the network elements are the same as in FIG. 2, but the call routing and signalling messages differ. A main difference is that, instead of generating a TCAP query message, the Access Tandem SSP 38 uses ISUP signalling to cause the ISUP module 72 of SMP 68 to set up the LNP IAM. It should be noted that, in the procedure described with reference to FIG. 2, the Access Tandem SSP 38 put the dialled digits into the Initial Address Message as the Original Called Party Number because it received them as different digits of a TCAP response message. In the procedure to be described with reference to FIG. 3, the Access Tandem SSP 38 does not generate a TCAP query; and the SMP unit 68 performs the function of translating from dialled digits to an Original Called Party Number parameter and adding that parameter to the IAM sent to SSP 10.

When the customer A moves from CLEC switch 44 to TELCO switch 16, the SMP 68 and SCP 30 are notified and make entries in their LNP databases 69 and 31, as before, linking the ported directory number 613 567 1111 with the Location Routing Number 715 566 0000 of SSP 10. The software in SMP unit 68 is arranged so that, when it receives the original dialled digits in a TCAP query, the SMP unit 68 will return them as the "original called party number". No PODP or TAT trigger is armed at the Access Tandem SSP 38 to generate a TCAP query on the ported directory number. Instead, a routing instruction is made in its PODP table so that all calls to the ported directory number 613 567 1111 will be routed via trunk 40 to recipient SSP 10. All calls prefixed 613 567 will be routed to the CLEC via the Access Tandem SSP 38 which will be set up to translate calls to ported directory numbers to the tenth digit.

A sample call sequence will now be described, the steps being represented in FIG. 3 by encircled numbers adjacent the trunks and links.

1. Caller B at SSP 12 attempts to call subscriber A by dialling the ported directory number 613 567 1111.

2. SSP 12 routes the call in the normal way to SSP 14, sending an IAM message (not shown) via STP 20.

3. SSP 14 routes the call to the Access Tandem SSP 38 in the usual way i.e based upon NPA-NXX.

4. The routing instruction in the PODP table at Access Tandem SSP 38 causes the Access Tandem SSP 38 to seize a circuit in trunk 40 and route the call to recipient SSP 10, i.e. back into the TELCO network. Simultaneously, the Access Tandem SSP 38 sends an Initial Address Message (IAM) to the ISUP module 72 of Signal Mediation Point unit 68. The IAM is in the standard format and contains the dialled digits or ported directory number as the Called Party Number.

5. The ISUP module 72 responds to the IAM message by accessing its LNP database 69 to obtain the new physical location of the ported number, i.e. the Location Routing Number of SSP 10, and sends to SSP 10, via STP 20, an ISUP IAM message including the Location Routing Number as the Called Party Number and the original dialled digits (ported number) as the Original Called Party Number. This is received at the SSP 10 as a standard IAM message.

6. On receipt by SSP 10 of an Initial Address Message containing, as the Called Party Number, its Location Routing Number (which cannot be dialled), an AIN Public Office Dialling Plan (PODP) trigger or Termination Attempt Trigger (whichever is preferred and provisioned) will cause the SSP 10 to send a TCAP query to the TCAP module 70 of SCP 30, via STP 20, to request call instructions. The TCAP query is in the form of a TCAP message containing the LRN (715 566 0000) as the Called Party Number and the dialled digits (613 567 1111) as the Original Called Party Number parameter. The SCP 30 accesses its LNP database 31 and confirms that the number has been ported. The SCP 30 returns to SSP 10 a TCAP message in which it has transferred the dialled digits from the Original Called Party Number parameter to the Called Party Number parameter.

7. On receipt of the TCAP message from the SCP 30, SSP 10 completes the call to the Called Party Number, i.e. ported directory number 613 567 1111.

It should be noted that this procedure avoids trunk "tromboning" in the trunk 42 between the access tandem SSP 38 and SSP 14.

It is envisaged that step 6 could be eliminated by modifying step 5 so that, when sending the IAM to SSP 10, the SMP 68 would include the ported directory number as the Called Party Number parameter.

It is also envisaged that some Access Tandem SSPs in the TELCO network could be provisioned to perform the "TCAP" procedure described with reference to FIG. 2 and others could be provisioned to perform the "ISUP" procedure described with reference to FIG. 3. The SMP 68 would be provisioned to handle both procedures, enabling greater flexibility.

Although the above-described embodiments use the Location Routing Number as the network address of the recipient switching unit or node, it is envisaged that other forms of network address might be used instead, such as those proposed in the so-called Carrier Portability Code (CPC) and the "Name and Address" schemes, both of which were considered by the ICC as alternatives to the proposed LRN LNP procedure described herein. In the CPC scheme, each LEC has a unique 3-digit identifer equivalent to a NPA number, a NPA-NXX-XXXX number being replaced by a CPC-NXX-XXXX number. For non-ported numbers, the CPC identifier is the NPA code. In the "Name and Address" scheme, each subscriber has a "name" which is the subscriber's directory number (NPA-NXX-XXXX), and an "address" which is a Network Node Address, e.g. NPA-NYY-YYYY. In embodiments of the present invention, therefore, the SMP 68 could use the CPC address or the Network Node Address instead of the LRN when returning the call into the TELCO network.

It should be appreciated that, although separate LNP databases 31 and 69 have been described, they could, if desired, be a shared resource, as could other elements of the network.

It should also be appreciated that embodiments of the present invention simply redirect calls which originate in the TELCO network and are destined for ported directory numbers within the TELCO network. If the call originates outside the TELCO network, or the ported number is outside the TELCO network, the SMP may convert the IAM in accordance with the procedure set out in copending patent application Ser. No. 08/690,474.

Although embodiments of the invention have been described and illustrated in detail, it is to be clearly understood that the same is by way of illustration and example only and is not to be taken by way of the limitation, the spirit and scope of the present invention being limited only by the appended claims.

What is claimed is:

1. A method of routing calls in a telephone network having a plurality of network nodes each having a unique network address and using out-of-band signalling messages for call setup and routing, said network nodes including a donor network node from which a directory number has been ported, a recipient network node which has received the ported directory number, a plurality of originating network nodes, and a predetermined intermediate network node through which all calls routed from said plurality of originating network nodes to the donor network node must pass, the predetermined intermediate node being set up for intercepting calls to ported directory numbers and initiating conversion of their associated signalling messages, the method comprising the steps of:

at one of said originating network nodes, creating a signalling message for a call to the ported directory number, the signalling message including the ported directory number as a called party number parameter, and routing the call from said one of said originating network nodes towards the donor network node;

intercepting the call at said predetermined intermediate network node;

converting the ported directory number to a network address of the recipient network node and incorporating said network address in a further signalling message;

routing the call from said predetermined intermediate node to the recipient network node using said further signalling message; and at the recipient network node, completing the call to the ported directory number.

2. A method as claimed in claim 1, in a telephone network which further comprises at least one database unit for data linking ported directory numbers with network addresses of the respective recipient network nodes, said originating network nodes using point-in-call triggers to initiate queries to the database unit, the out-of-band signalling messages comprising Signalling System No. 7 Initial Address Messages for controlling routing of the calls, said Initial Address Messages including selected ones of several parameters, including a Called Party Number parameter and an Original Called Party Number parameter, the method further comprising the steps of:

when the directory number is ported, making an entry at said database unit linking the ported directory number with the network address of the recipient network node and arming a trigger at said predetermined intermediate network node, the trigger initiating redirection of calls to said ported directory number, subsequently, at said one of said originating network nodes where the call to the ported directory number is being set up, formulating an Initial Address Message with the ported directory number as a Called Party Number parameter and routing the call to said predetermined intermediate network node; and at the predetermined intermediate network node, upon operation of the trigger by the ported directory number as the Called Party Number parameter, exchanging signalling messages with said database unit to obtain said network address for the recipient network node and, upon receipt of the network address, formulating a redirection Initial Address Message with the network address as the Called Party Number parameter and the ported directory number as the Original Called Party Number parameter and, using the network address, routing the call to the recipient network node for completion.

3. A method as claimed in claim 2, further comprising the steps of:

upon receipt at the recipient network node of said Initial Address Message with the network address of the recipient network node as the Called Party Number parameter, querying a central database unit with a signalling message including the ported directory number, at the central database unit, confirming that the ported directory number has been ported and returning a message to the recipient network node with the ported directory number as the Called Party Number parameter, and at the recipient network node, on receipt of the ported directory number as the Called Party Number parameter, completing the call thereto.

4. A method as claimed in claim 1, in a telephone network which further comprises a central control unit having access to a database for data linking ported directory numbers with network addresses of the respective recipient network nodes, the out-of-band signalling messages comprising Signalling System No. 7 Initial Address Messages for controlling routing of the calls, said Initial Address Messages including selected ones of several parameters, including a Called Party Number parameter and an Original Called Party Number parameter, the method further comprising the steps of:

when the directory number is ported, making an entry in the database linking the ported directory number with the network address of the recipient network node and entering a routing instruction at the predetermined intermediate network node to redirect calls for the ported directory number back to the recipient network node;

subsequently, at said one of said originating network nodes placing a call to the ported directory number, creating an Initial Address Message with the ported directory number as the Called Party Number parameter and routing the call to the predetermined intermediate network node;

at the predetermined intermediate network node, upon receipt of the call, routing the call to the recipient network node and sending an Initial Address Message to the central control unit with the ported directory number as the Called Party Number parameter;

at the central control unit, accessing the database and obtaining the network address for the recipient network node and sending to the recipient network node an Initial Address Message with the network address as the Called Party Number parameter and the ported directory number as the Original Called Party Number parameter; and at the recipient network node, completing the call to the ported directory number designated as the Original Called Party Number parameter.

5. A method as claimed in claim 4, wherein completion of the call comprises the steps of:

at the recipient network node, upon receipt of the Initial Address Message, sending a query to a second central control unit for call completion instructions, the query comprising the ported directory number as the Original Called Party Number parameter, at the second central control unit, accessing a second database and confirming that the ported directory number designated as the Original Called Party Number has in fact been ported and returning the Original Called Party Number parameter as the Called Party Number parameter; and at the recipient network node, completing the call to the ported directory number as the Called Party Number.

6. A telephone network comprising a plurality of network nodes each having a unique network address and means for employing out-of-band signalling for call setup and routing, said network nodes comprising a donor node from which a directory number has been ported, a recipient node to which said directory number has been ported, a plurality of originating network nodes and a predetermined intermediate node through which all calls routed from said plurality of originating network nodes to the donor network node must pass, the telephone network comprising:

at each of the plurality of originating network nodes, means for routing a call, using the ported directory number as the called party number parameter in a signalling message, from the originating network node towards the donor network node;

means at said predetermined intermediate network node for intercepting the call, acquiring a network address of the recipient network node, and routing the call to the recipient network node using said network address in a further call routing message; and means at the recipient network node for completing the call to the ported directory number.

7. A network as claimed in claim 6, further comprising a first network part controlled by a first carrier and a second network part controlled by a second carrier, the predetermined intermediate node being located at an access point between said first network part and said second network part, the originating nodes and recipient node being located in the first network part and the donor node being in the second network part.

8. A network as claimed in claim 7, further comprising a service mediation server associated with the predetermined intermediate node, the service mediation server controlling the exchange of signalling messages between the first network part and the second network part.

* * * * *